(12) United States Patent
Tabata (10) Patent No.: US 7,798,797 B2
(45) Date of Patent: Sep. 21, 2010

(54) FOAMING DIE DEVICE FOR FORMING ARMREST

(75) Inventor: Tsuyoshi Tabata, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 790 days.

(21) Appl. No.: 11/640,299

(22) Filed: Dec. 18, 2006

(65) Prior Publication Data

US 2008/0145474 A1 Jun. 19, 2008

(51) Int. Cl.
*B29C 45/14* (2006.01)

(52) U.S. Cl. .................. 425/116; 425/4 R; 425/192 R; 425/442; 249/95; 249/97; 249/170; 264/46.6; 264/263

(58) Field of Classification Search .................. 425/4 R, 425/116, 190, 192 R, 441, 392, 393, 817 R, 425/442, 443; 249/83, 85, 95, 91, 97, 170; 264/261, 263, 46.6
See application file for complete search history.

(56) References Cited

U.S. PATENT DOCUMENTS

| | | | | | |
|---|---|---|---|---|---|
| 3,387,076 | A | * | 6/1968 | Murooka | 264/276 |
| 3,617,876 | A | * | 11/1971 | Robinson | 324/538 |
| 3,788,590 | A | * | 1/1974 | Hasselbach | 249/95 |
| 4,155,533 | A | * | 5/1979 | Lambrecht | 249/95 |
| 4,255,111 | A | * | 3/1981 | Suzuki | 425/383 |
| 4,487,565 | A | * | 12/1984 | Simms et al. | 425/115 |
| 4,501,541 | A | * | 2/1985 | Bethell et al. | 425/117 |
| 4,544,126 | A | * | 10/1985 | Melchert | 249/83 |
| 4,688,752 | A | * | 8/1987 | Barteck et al. | 249/85 |
| 4,786,447 | A | * | 11/1988 | Kouda | 264/46.6 |
| 4,807,843 | A | * | 2/1989 | Courtois et al. | 249/61 |
| 5,196,210 | A | * | 3/1993 | Yoshihara et al. | 425/116 |
| 5,316,467 | A | * | 5/1994 | Starkey | 425/438 |
| 5,344,296 | A | * | 9/1994 | Laninga | 425/121 |
| 5,405,255 | A | * | 4/1995 | Neu | 425/116 |
| 5,460,503 | A | * | 10/1995 | Kitajima et al. | 425/116 |
| 5,637,327 | A | * | 6/1997 | Nakagawa | 425/116 |
| 5,698,239 | A | * | 12/1997 | Tsai et al. | 425/384 |
| 5,738,880 | A | * | 4/1998 | Kane et al. | 425/116 |
| 6,004,498 | A | * | 12/1999 | Fujii et al. | 264/255 |
| 6,187,247 | B1 | * | 2/2001 | Buzzell et al. | 264/334 |

(Continued)

FOREIGN PATENT DOCUMENTS

JP 2000-236986 9/2000

*Primary Examiner*—Steven P Griffin
*Assistant Examiner*—Seyed Masoud Malekzadeh
(74) *Attorney, Agent, or Firm*—Browdy and Neimark, PLLC (57) ABSTRACT

A foaming die device is provided, in which can be directly placed a basic armrest unit having a shaft element and a connecting bracket rotatably secured to the shaft element. The foaming die device comprises a lower die, an upper die, and an auxiliary die element of split type to be incorporated in a working die area defined by the lower and upper dies. The auxiliary die element comprises two die pieces that can be mated together so as to be in a slidable engagement about one end portion of the shaft element. Hence, the mated two die pieces or auxiliary die element is slidable along the shaft element for its partial engagement in a through-hole of the basic armrest unit, whereupon all the basic armrest unit and auxiliary die element may be directly placed in the working die area of lower and upper dies and subjected to foaming process.

4 Claims, 4 Drawing Sheets

U.S. PATENT DOCUMENTS

| | | | |
|---|---|---|---|
| 6,409,865 B1 * | 6/2002 | Yates | 156/214 |
| 6,620,365 B1 * | 9/2003 | Odoi et al. | 264/261 |
| 6,623,678 B2 * | 9/2003 | Anderson | 264/162 |
| 6,824,373 B2 * | 11/2004 | Takei | 425/116 |
| 7,014,445 B2 * | 3/2006 | Hung | 425/183 |
| 7,028,973 B1 * | 4/2006 | Hibino et al. | 249/95 |
| 7,127,859 B2 * | 10/2006 | Domizio | 52/576 |
| 7,204,683 B2 * | 4/2007 | Shibata et al. | 425/116 |
| 7,510,383 B2 * | 3/2009 | Tabata | 425/4 R |
| 2003/0077345 A1 * | 4/2003 | Suzuki et al. | 425/116 |
| 2004/0000738 A1 * | 1/2004 | Tanaka | 264/46.6 |
| 2007/0243280 A1 * | 10/2007 | Huang | 425/393 |

* cited by examiner

FOAMING DIE DEVICE FOR FORMING ARMREST

BACKGROUND OF THE INVENTION

1. Field of the Invention

The present invention relates to a foaming die device for forming an armrest for use on a seat. In particular, the invention is directed to a foaming die device for forming an armrest of the type having a connecting bracket provided therewith, wherein the connecting bracket is disposed exteriorly of the armrest and adapted for connection with a seat back of a seat.

2. Description of Prior Art

For example, as known from the Japanese Laid-Open Patent Publication No. 2000-236986, there is a foaming die device designed to form an armrest having a connecting support shaft whose two end portions project from the respective two lateral walls of the armrest. According thereto, a three-dimensional trim cover assembly preformed in a predetermined shape of armrest and a support shaft are provided in combination, as a basic armrest unit, wherein the support shaft extends transversely in the trim cover assembly, with two end portions of that support shaft projecting outwardly from the respective two lateral walls of the trim cover assembly. Also, an upper die and a lower die are provided, each of which has: a working die area for receiving therein substantially a half of the afore-said trim cover assembly; and a semi-circular recessed portion for receiving therein substantially a half of each of the afore-said two end portions of support shaft.

In operation, the trim cover assembly is placed in both of the upper and lower dies, such that each of the two end portions of support shaft is received in a cylindrical hole defined by mated two semi-circular recessed portions respectively of the upper and lower dies. Thereafter, a liquid foaming agent is injected via an injection nozzle into the inside of the trim cover assembly placed in both upper and lower dies, and is cured into an increased mass of foaming padding filled in the trim cover assembly. Thus, a resultant armrest is formed, in which the two end portions of support shaft project outwardly from the respective two lateral walls of the trim cover assembly.

At a subsequent process for attaching the foregoing armrest to a seat back of a seat, it is a common practice to connect one of the two support shafts, via a connecting bracket, to that seat back.

In this context, with regard to the previously stated basic armrest unit, there is another type of basic armrest unit wherein a connecting bracket is integrally provided to one of the two end portions of the support shaft extending transversely through the trim cover assembly, in advance before undergoing the foaming process stated above. In such instance, it is a hitherto practice to disengage the connecting bracket from the basic armrest unit before a foaming operation, and, after completion of the foaming operation for that basic armrest unit in a foaming die device, the connecting bracket is rotatably attached to a resultant armrest. This is because it is extremely difficult to technically define a location for receiving such integral connecting bracket in the foaming die device in such a manner as to completely prevent leakage of the liquid foaming agent through the location where the integral connecting bracket is placed.

SUMMARY OF THE INVENTION

In view of the above-stated drawbacks, it is a purpose of the present invention to provide an improved foaming die device which allows a basic armrest unit with a connecting bracket to be directly placed therein and subjected to foaming therein.

In order to achieve such purpose, there is provided a foaming die device of such a type that allows a basic armrest unit to be placed therein and also allows the basic armrest unit to be subjected to a foaming process therein, wherein the basic armrest unit comprises: a three-dimensional trim cover assembly of a predetermined shape of armrest body; the three-dimensional trim cover assembly including a through-hole formed therein; a support element disposed in an inside of the three-dimensional trim cover assembly, the support element having two end portions projecting outwardly through the through-hole of the three-dimensional trim cover assembly; and a connecting bracket rotatably secured to one of the two end portions of the support element, the connecting bracket being thus disposed exteriorly of the three-dimensional trim cover assembly, and wherein, at the foaming process, a liquid foaming agent is to be injected into the inside of the three-dimensional trim cover assembly and then cured into an increased mass of foam padding filled in the three-dimensional trim cover assembly, thereby forming a resultant armrest having the connecting bracket provided exteriorly thereof in a rotatable manner, the foaming die device being basically comprised of:
a first die element;
a second die element movable for engagement with the first die element to define a working die area therein, the working die area being adapted to allow the three-dimensional trim cover assembly of the basic armrest unit provided with the connecting bracket to be placed therein; and
an auxiliary die element to be incorporated in the working die area defined by the first and second die elements, the auxiliary die element being of a split type comprising a first die piece and a second die piece in such a manner as to allow the first and second die pieces to be mated together, with aid support element disposed therebetween, in a direction orthogonal with an axis of the support element, so that the thus-mated first and second die pieces enclose the connecting bracket and slidably engages the support element, thereby allowing the mated first and second die pieces to be slidingly movable along the support element towards the through-hole of the three-dimensional trim cover assembly so as to allow insertion of a part of the mated first and second die pieces in the particular through-hole.

Preferably, the through-hole may be of such a diameter that allows the afore-said part of the mated first and second die pieces to be inserted therethrough into the inside of the three-dimensional trim cover assembly.

Other various features and advantages of the present invention will become apparent from reading of the description, hereinafter, with reference to the annexed drawings.

DETAILED DESCRIPTION OF PREFERRED EMBODIMENT OF THE INVENTION

Referring to FIGS. 1 through 8, there is illustrated a preferred exemplary embodiment of foaming die device in accordance with the present invention, which is designed to form an armrest of the type having a connecting bracket disposed exteriorly thereof, the connecting bracket being adapted for connection with a seat back of a seat (not shown).

Figure 1:
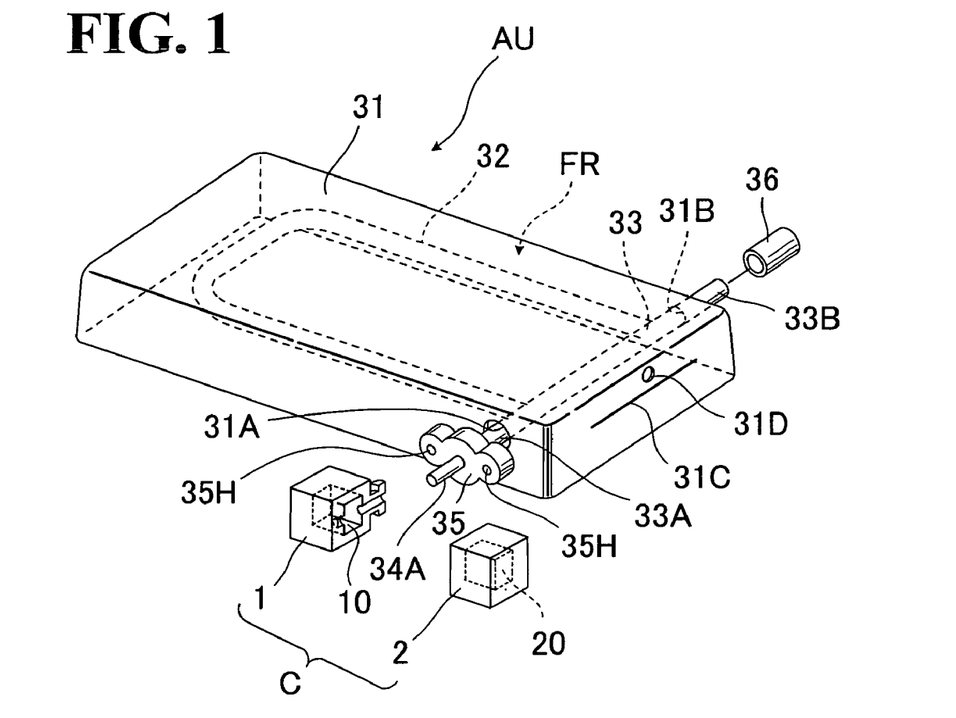
FIG. 1 is a schematic perspective view showing an auxiliary die element, one element of a foaming die device in accordance with the present invention, and a basic armrest unit to be used in the foaming die device.

FIG. 1 shows, in perspective, a basic armrest unit (AU) which is-to be placed in the foaming die device of the present invention for undergoing a foaming process to be set forth later. The basic armrest unit (AU) itself is a basic unit, as customarily preformed in the art, from which the foregoing type of armrest is formed by the foaming die device. Hence, the basic armrest unit (AU) comprises: a three-dimensional trim cover assembly (31) preformed in a predetermined shape of armrest; a generally U-shaped frame (32); a transverse tubular element (33); and a connecting bracket (35), as known in the art.

Figure 5:
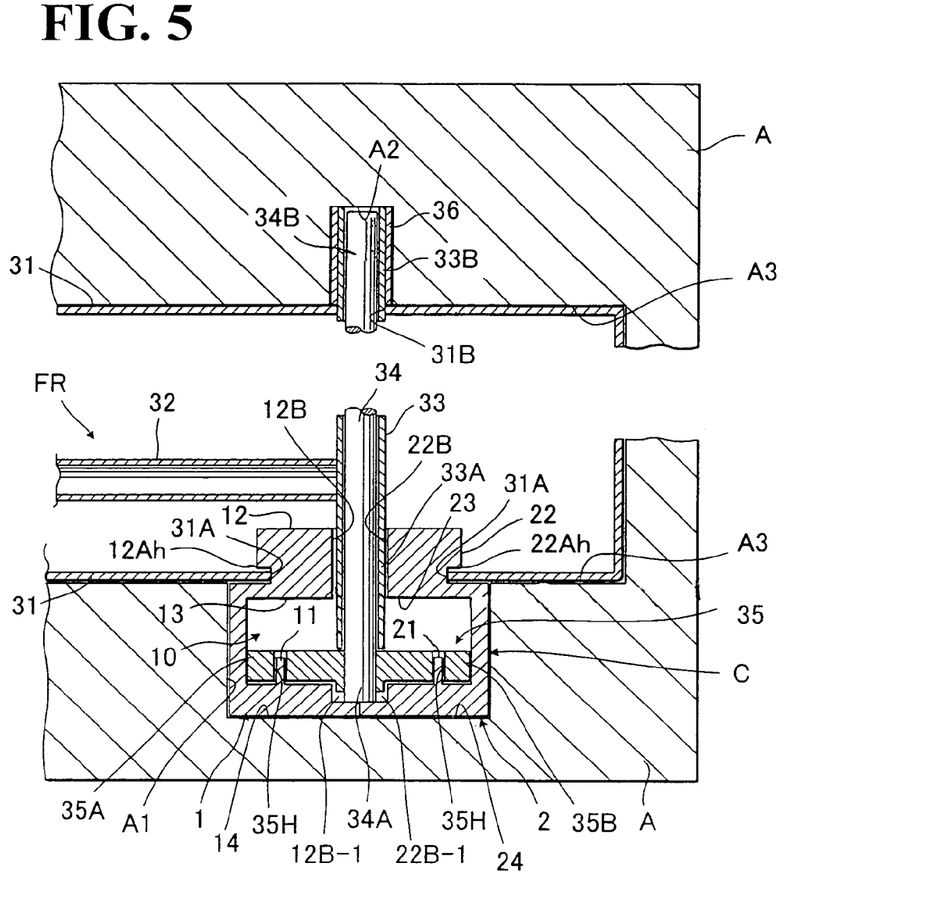
FIG. 5 is a partly broken fragmentary sectional view showing the state where the basic armrest unit and the auxiliary die element are placed in a lower die of the foaming die device.

As best shown in FIGS. 1 and 5, in accordance with the present invention, the trim cover assembly (31) is formed with a first through-hole (31A) in one lateral wall thereof. Designation (31B) denotes a second through-hole formed in another lateral wall of the trim cover assembly (31). This second through-hole (31B) is a conventional through-hole for allowing insertion therethrough of a second end portion (33B) of the known transverse tubular element (33). Designations (31C) and (31D) respectively denote an elongated opening and an injection hole formed in one particular wall of the trim cover assembly (31) as shown.

As will be described later, the first through-hole (31A) is one of principal elements of the present invention, which has an outer diameter large relative to an inner diameter of the second through-hole (31B), the outer diameter being however slightly smaller than an outer diameter of two mated protrudent portions (1B) (2B) of an auxiliary die element (C) to be set forth later.

The generally U-shaped frame (32) is integrally connected with the transverse tubular element (33), as illustrated. The connecting bracket (35) is formed with a pair of connecting holes (35H) (35H) for allowing two respective securing bolts or the like (not shown) to pass therethrough for connection of the bracket (35) per se with a predetermined area of seat back (not shown).

A support shaft (34) is rotatably disposed in and along the transverse tubular element (33), and a first end portion (34A) of that shaft (34) is integrally connected with a center of the connecting bracket (35). Hence, the connecting bracket (35) is rotatably provided to the trim cover assembly (31).

In assembly of the foregoing known basic armrest unit (AU), all of those frame (32) and tubular element (33) are inserted through the elongated opening (31C) into the inside of trim cover assembly (31) and placed therein, in such a manner that, as understandable from FIG. 5, the first end portion (33A) of transverse tubular element (33) as well as the connecting bracket (35) pass through the first through-hole (31A) of trim cover assembly (31) and project outwardly from one lateral wall of the trim cover assembly (31), while on the other hand, the second end portion (33B) of transverse tubular element (33) passes through the second through-hole (31B) of trim cover assembly (31) and projects outwardly from another lateral wall of the trim cover assembly (31). Hence, the connecting bracket (35) is disposed exteriorly of the basic armrest unit (AU).

Figure 4:
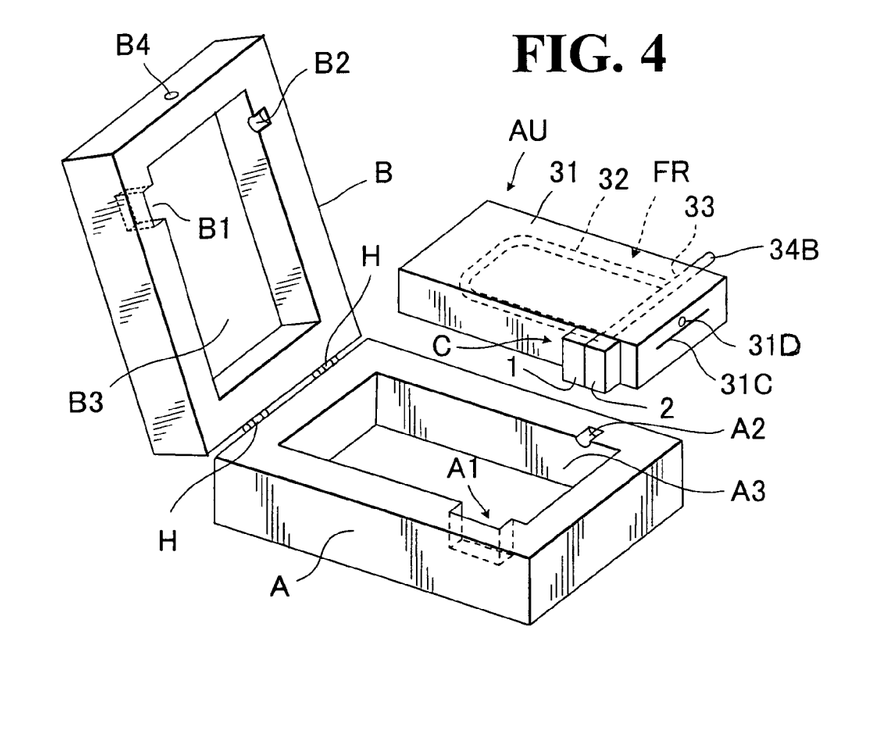
FIG. 4 is a schematic perspective view showing all principal parts of the foaming die device of the present invention and also showing the state where the auxiliary die element is attached to the basic armrest unit.

As can be seen in FIG. 4, the foaming die device includes a basic die element of split type comprising a lower die (A) and an upper die (B) hingedly connected via a hinge (H) with the lower die (A), so that the upper die (B) may be rotated about the hinge (H) downwardly for mating engagement with the lower die (A) so as to define a working die area (at A3 and B3) therebeween to allow an entirety of the trim cover assembly (31) to be placed therein. Designation (36) denotes a tubular bearing die piece adapted for use in conjunction with both of the lower and upper dies (A) (B) so as to supportively receive a second end portion (33B) of tubular transverse element (33) therein.

Figure 2:
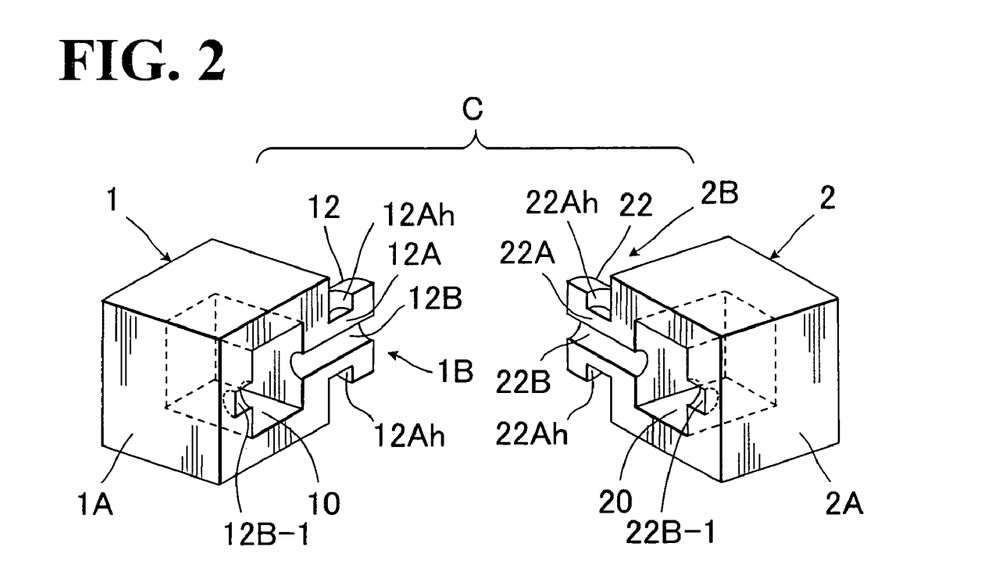
FIG. 2 is a schematic perspective view showing a first die piece and a second die piece, which, comprise the auxiliary die element.

In accordance with the present invention, as best seen in FIG. 2, the foaming die device comprises an auxiliary die element (C) of a split type having: a first die half or a first die piece, designated by (1); and a second die half or a second die piece, designated by (2), wherein those two die pieces (1) (2) can be mated together to enclose the connecting bracket (35) and can be incorporated in the working die area defined by the foregoing lower and upper dies (A) (B), as will be elaborated later.

Figure 3:
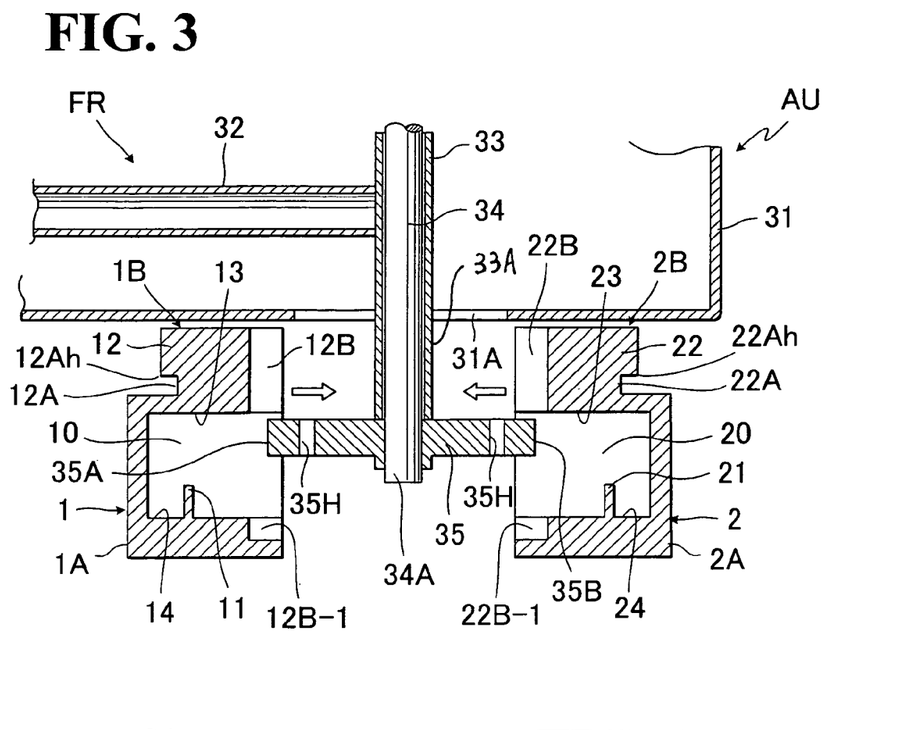
FIG. 3 is a fragmentary sectional view for explanatorily showing how the first and second die pieces are mated together to enclose a connecting bracket of the basic armrest unit.

Specifically, the first die piece (1) is so formed to have: a main body portion (1A) of generally cubic configuration; and a protrudent portion (1B) of generally half-round or semi-cylindrical configuration which projects integrally and outwardly from one lateral wall of the main body portion (1A). Formed in the main body portion (1A) is a rectangular recession (10) larger than one half portion (35A) of the afore-said connecting bracket (35). As best seen in FIG. 3 in conjunction with FIG. 2, a pin (11) erects fast on one inner surface (14) of that rectangular recession (10) and extends towards an opposite inner surface (13) of that particular recession (10), such that a space is provided between a distal end of the pin (11) and the opposite inner surface (13) so as to allow entry therein of the foregoing one half portion (35A) of the connecting bracket (35). The protrudent portion (1B) is formed with a semi-circular flange portion (12), a half-round neck portion (12A) smaller than the semi-circular flange portion (12), and a semi-circular recessed portion (12Ah) defined between those semi-circular flange portion (12) and half-round neck portion (12A).

As shown in FIGS. 2 and 3, a first semi-circular through-hole (12B) extends in and through the protrudent portion (1B) and one wall (at 13) of the main body portion (1A) with which is integrally formed that particular protrudent portion (1B). Designation (12B-1) denotes a second semi-circular hole which is formed in another wall (at 14) of the recession (10) in alignment with the first semi-circular through-hole (12B).

Likewise as in the foregoing first die piece (1), the second die piece (2) comprises a main body portion (2A) and a protrudent portion (2B). Formed in the main body portion (2A) is a rectangular recession (20) larger than another half portion (35B) of the afore-said connecting bracket (35). As best seen in FIG. 3 in conjunction with FIG. 2, a pin (21) erects fast on one inner surface (24) of that recession (20) and extends towards an opposite inner surface (23) of the recession (20), such that a space is provided between a distal end of the pin (21) and the opposite inner surface (23) so as to allow entry therein of the foregoing another half (35B) of the connecting bracket (35). The protrudent portion (2B) is formed with a semi-circular flange portion (22), a half-round neck portion (22A) smaller than the semi-circular flange portion (22), and a semi-circular recessed portion (22Ah) defined between those semi-circular flange portion (22) and half-round neck portion (22A).

As shown in FIGS. 2 and 3, a first semi-circular through-hole (22B) extends in and through the protrudent portion (2B) and one wall (at 23) of the main body portion (1A) with which is integrally formed that particular protrudent portion (2B). Designation (22B-1) denotes a second semi-circular hole which is formed in another wall (at 24) of the recession (20) in alignment with the first semi-circular through-hole (22B).

Figure 7:
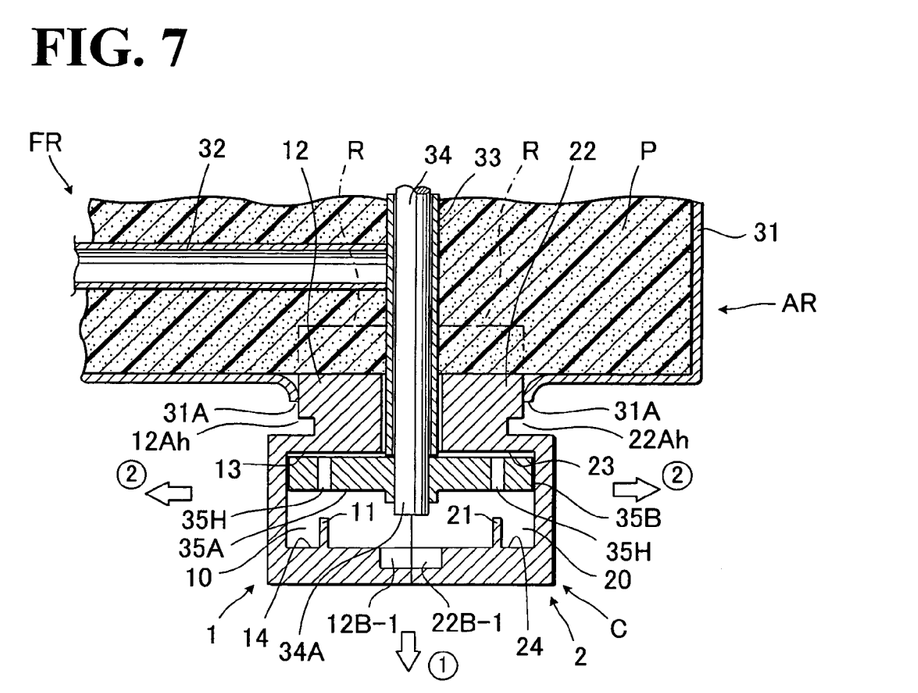
FIG. 7 is a fragmentary sectional view for explanatorily illustrating how the auxiliary die element is removed from the connecting bracket of a resultant armrest formed by the foaming die device.

The arrangement of afore-said two pins (11) (12) in the two respective rectangular recessions (10) (20) is such that, when the first and second die pieces (1) (2) are mated and engaged together, the two pins (11) (12) are respectively in a coaxial alignment with the two connecting holes (35H) (35H) of the connecting bracket (35), as understandable from FIG. 7.

Accordingly, it is to be seen that the two halves (35A) (35B) of connecting bracket (35) as well as the first end portion (33A) of transverse tubular element (33) may be completely enclosed with the first and second die pieces (1) (2) which are mated with each other.

On the other hand, as shown in FIG. 4, the lower die (A) has, formed therein, a working die area (A3) so configured as to receive a lower half of the trim cover assembly (31). In that working die area (A3), a rectangular localized recession (A1) and a semi-circular localized recession (A2) are formed in a mutually opposed relationship, as illustrated.

Likewise, the upper die (B) has, formed therein, a working die area (B3) so configured as to receive an upper half of the trim cover assembly (31), thereby being able to match and align with the foregoing working die area (A3) of lower die (A). Formed in a mutually opposed relationship in that working die area (A3) are a rectangular localized recession (B1) and a semi-circular localized recession (B2), which correspond in sizes and position to the foregoing two localized recessions (A1) and (A2) of lower die (A), respectively.

It is noted that, when the upper die (B) is engaged on the lower die (A), the two localized recessions (A1) (B1) are matched and mated together to provide a cubic space substantially identical to or slightly larger than a cubic contour of mated two main body portions (1A) (2A) (as best seen in FIG. 4) respectively of the first and second die pieces (1) (2), whereas the two semi-circular localized recessions (A2) (B2) are matched and mated together to provide a cylindrical hole having an inner diameter slightly larger than an outer diameter of the tubular bearing die piece (36).

Now, a description will be made of how the above-described foaming die device is used and operated.

At first, as can be seen from FIGS. 2, 3 and 4, the first and second die pieces (1) (2) (auxiliary die element (C)) are mated together, with the transverse tubular element (33) disposed therebetween, in a direction orthogonal with a longitudinal axis of that tubular element (33). Thus, the first and second die pieces (1) (2) are respectively brought to the two half portions (35A) (35B) of connecting bracket (35), as indicated by the arrows in FIG. 3, so that those particular two half portions (35A) (35B) are inserted in and enclosed with the respective first and second die pieces (1) (2). Namely, the first and second die pieces (1) (2) are completely mated and contacted with each other, thereby aligning and matching the rectangular recession (10) of the first die piece (1) with the rectangular recession (20) of the second die piece (2) to establish one cubic space in which a whole of the connecting bracket (35) is placed, while at the same time, the first and second semi-circular recessed portions (12B) (12B-1) of first die piece (1) are respectively matched and aligned with the first and second semi-circular recessed portions (22B) (22B-1) of second die piece (2), whereupon there are defined: a circular through-hole in which the first end portion (33A) of transverse tubular frame (33) is partway received and supported; and another small circular hole in which the first end portion (34A) of the support shaft (34) is received and supported.

At this point, it is noted that the connecting bracket (35) is positioned adjacent to the two coplanar first inner walls (13) (23) respectively of the thus-aligned two rectangular recessions (10) (20), such that the two connecting holes (35H) (35H) thereof are in coaxial alignment with the aforementioned two pins (11) (21), respectively, and are however being positioned distant from the latter (11) (21). This state is not clearly shown, but can be understood from FIG. 7.

The thus-mated first and second die pieces (1) (2) are pushed towards the first through-hole (31A) to forcibly cause a columnar entirety of the mated two protrudent portions (1B) (2B) thereof to pass through the first through-hole (31A) which is thereby resiliently widened, until an entire circular edge portion of that particular first through-hole (31A) is resiliently and tight engaged in and about the entire circular recessed portions (12Ah and 22Ah) of the mated two protrudent portions (1B) (2B). Simultaneous with such movement of the mated two die pieces (1) (2), the two pins (11) (21) are displaced towards and engaged in the respective two connecting holes (35H) (35H) of the connecting bracket (35), while the connecting bracket (35) is brought to contact with the coplanar two inner surfaces (14) (24) respective of the first and second die pieces (1) (2), as can be seen from FIG. 5. Further, the first end portion (34A) of the support shaft (34) is inserted and received in the circular hole defined by the first and second semi-circular recessed portions (12B-1) (22B-1).

In that way, both transverse tubular frame (33) and connecting bracket (35) are positioned in place within the two mated dies (A) (B) and assuredly prevented against dislocation, and furthermore, the first and second die pieces (1) (2) are positively prevented against separation from each other due to the aforementioned engagement of the two pins (11) (21) in the respective two connecting holes (35H) (35H). Otherwise stated, both of the connecting bracket (35) and the mated two die pieces (1) (2) are placed in a locked state against movement by such two pins (11) (21).

Accordingly, as can be seen in FIGS. 4 and 5, the auxiliary die element (C) is temporarily attached to one lateral side of the basic armrest unit (AU), without separation between the first and second die pieces (1) (2), such that the main body portions (1A and 2A) thereof are situated exteriorly of the trim cover assembly (31), while the protrudent portions (1B and 2B) thereof situated interiorly of the trim cover assembly (31). Hence, at this point, the auxiliary die element (C) encloses a whole of the connecting bracket (35) and the first end portion (33A) of the transverse tubular element (33) as well as the first end portion (34A) of the support shaft (34).

On the other hand, the tubular bearing die piece (36) is temporarily attached about the second end portion (33B) of transverse tubular frame (33).

The basic armrest unit (AU), with the auxiliary die element (C) and tubular die piece (36) stably attached thereto as above, is first placed in the lower die (A), such that a lower half of the trim cover assembly (31) and a lower half of the auxiliary die element (C) are respectively set in the working die area (A3) and rectangular localized recession (A1), while a lower half of the tubular die piece (36) set in the semi-circular localized recession (A2). Thereafter, the upper die (B) is rotated downwards and mated with lower die (A), so that the working die area (B3) and rectangular localized recession (B1) thereof enclose an upper half of the trim cover assembly (31) and an upper half of the auxiliary die element (C), respectively, while the semi-circular localized recession (B2) enclose an upper half of the tubular die piece (36).

Figure 6:
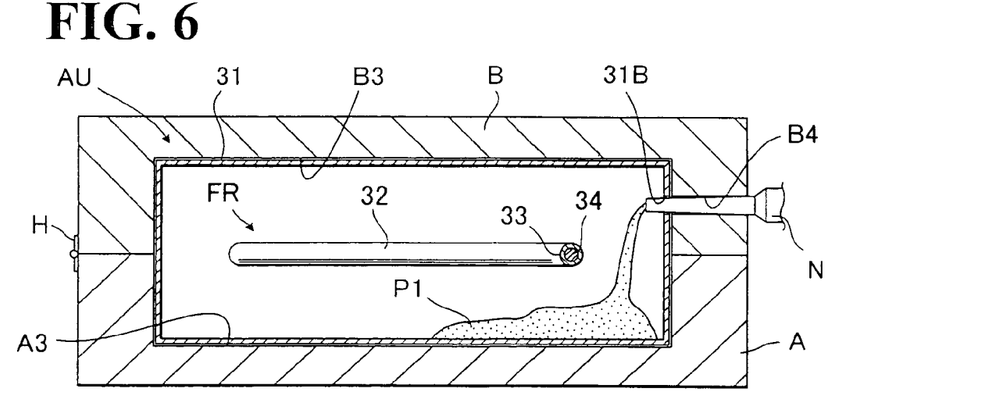
FIG. 6 is a sectional view showing the state where a liquid foaming agent is injected into a trim cover assembly of the basic armrest unit which is placed in the upper and lower dies of the foaming die device.

Next, as shown in FIG. 6, after having inserted the injection nozzle (N) through the two holes (B4) (31B) respectively of the upper die (B) and trim cover assembly (31), a predetermined amount of liquid foaming agent (P1) is injected from that injection nozzle (N) into She inside of the trim cover assembly (31). The liquid foaming agent (P1) is then cured and swollen into an increased mass of foam padding (P) in the trim cover assembly (31), so that a resultant armrest (AR) is formed, in which such mass of foam padding (P) is filled in the trim cover assembly (31).

It id appreciated that the first through-hole (31A) is temporarily sealed due to its circular edge portion being resiliently and tight engaged in and about the entire circular recessed portions (12Ah and 22Ah) of the mated two connecting protrudent portions (1B) (2B), thereby preventing leakage of the liquid foaming agent (P1) through the first through-hole (31A) during the foaming process.

At the completion of the foregoing foaming operation, after having rotated upwardly the upper die (B) via the hinge (H) away from the lower die (A), the resultant armrest (AR), with the auxiliary die element (C) and tubular bearing die piece (36) attached thereto, is taken out from the lower die (A).

Since the auxiliary die element (C) per se is slidingly movable along the transverse tubular element first end portion (33A), it is easily possible to displace the auxiliary die element (C) in a direction outwardly of the resultant armrest (AR). Therefore, after all the armrest (AR), auxiliary die element (C) and tubular support die piece (36) have been removed from the dies (A and BY, as understandable from FIGS. 5 and 7, the auxiliary die element (C) is slidingly moved outwardly along the longitudinal axis of the transverse tubular element (33) and forced out from the first through-hole (31A) of trim cover assembly (31), as indicated by the arrow ①, so that an entirety of the mated protrudent portions (1B and 2B) passes through the resiliently widened first through-hole (31A) to the outside of the armrest (AR), while at the same time, the second inner surfaces (13) (23) in the mated recessions (10) (20) are bought to contact with the connecting bracket (35), as seen in FIG. 7. At this moment, the two pins (11) (21) in the mated recessions (10) (20) are displaced outwardly and completely disengaged from the respective two connecting holes (11) (21) of the connecting bracket (35), thereby not only releasing the connecting bracket (35) from the locked state to the auxiliary die element (C), but also allowing separation between the first and second die pieces (1) (2).

As indicated by the one-chain dot lines (R), the localized region of the foam padding (P), corresponding to a point where the mated protrudent portions (1B and 2B) have been located in the trim cover assembly (31), is naturally swollen, by the reason of its resilient expansion property, to become a substantially planar wall at the first through-hole (31A).

Then, as indicated by the two arrows ② and ② in the FIG. 7 and as understandable by viewing the illustrations from FIG. 7 to FIG. 3, the first and second die pieces (1) and (2) of the thus-removed auxiliary die element (C) are now separated from each other, whereupon the auxiliary die element (C) is completely removed from the armrest (AR).

Figure 8:
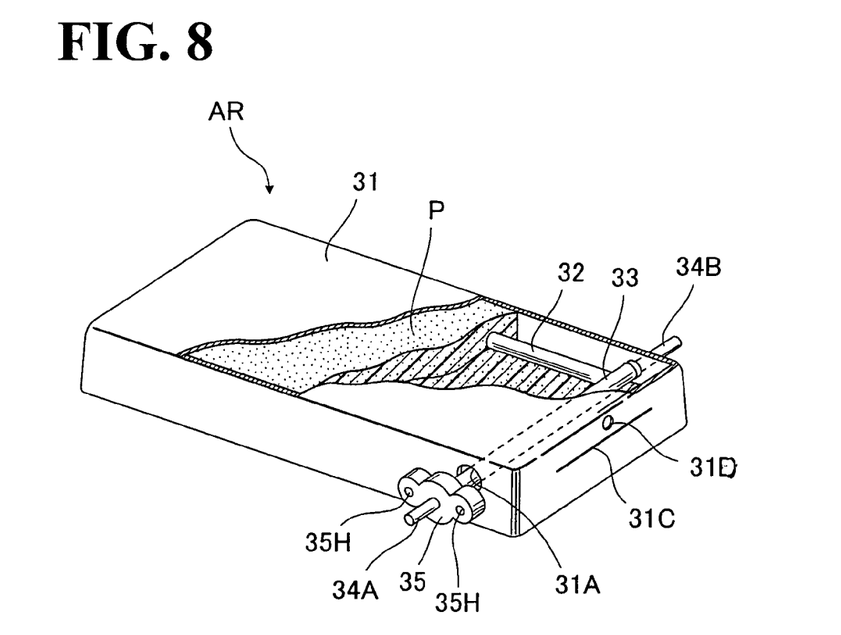
FIG. 8 is a partly broken perspective view of the resultant armrest formed by the foaming die device.

FIG. 8 shows a resultant armrest (AR) with the connecting bracket (35) projected outwardly therefrom, which is formed by the above-described foaming die device of the present invention. This resultant armrest (AR) may be rotatably attached via the connecting bracket (35) to a seat back of an automotive seat, for example.

With regard to the illustrative transverse tubular element (33) integral with the illustrative support shaft (33) rotatably provided in that transverse tubular element (33), any other alternative support element may be used, insofar as it is connected with the frame (32) so as to extend transversely of the trim cover assembly (33) and is rotatably coupled with the connecting bracket (35) at one end portion thereof. For example, a non-tubular or solid support element, such as a transverse shaft which is integral with the U-shaped frame (32), may be used, in which case, the connecting bracket (35) be rotatably attached to a predetermined end portion of such support shaft. In accordance with the present invention, it is appreciated that:

(i). The connecting bracket (35) can be easily and directly placed in position within the foaming die device via the auxiliary die element (C), as described above, for subsequent foaming processes, and therefore, there is no need to disconnect the connecting bracket (35) from the support shaft (34) before those particular elements are placed in the foaming die device, as found in the prior art. This eliminates the conventional final steps and labors for reconnecting the connecting bracket (35) to the support shaft (34) of resultant armrest after the completion of foaming operation.

(ii) By simply inserting the auxiliary die element (C) into the first through-hole (31A), the auxiliary die element (C) per se is slidingly moved along a longitudinal axis of the transverse tubular frame (33) in a direction inwardly of the trim cover assembly (31). Hence, the following various effects are attained:

(a) An entire circular edge portion of that first through-hole (31A) is resiliently engaged in the circular recessed portions (21Ah and 22Ah) in a tight way, thereby insuring to prevent leakage of the liquid foaming agent (P1) through the first through-hole (31A), and     (b) at the same time, the two pins (11) (21) are engaged in the respective two connecting holes (35H) of the connecting bracket (35), so that the first and second die pieces (1) (2) are in a locked state and thus prevented against separation from each other, which allows the basic armrest unit (AU) with the auxiliary die element (C) to be easily and directly placed in the lower die (A), without any care about separation between the first and second die pieces (1) (2). At this moment, further, the auxiliary die element (C) per se is prevented against rotation relative to the basic armrest unit (AU) and thus retained at a predetermined location with respect to the latter (AU), so that the basic armrest unit (AU) and auxiliary die element (C) can be directly set in the lower-die's working die area (A3) and the lower-die's rectangular localized recession (A1), respectively.

While having described the present invention thus far, it should be understood that the present invention is not limited to the illustrated embodiment, but any other modification, replacement and addition may be applied thereto without departing from the scopes of the appended claims.

What is claimed is:

1. A foaming die device that allows a basic armrest unit having a connecting bracket projected outwardly from one side thereof to be placed therein and also allows said basic armrest unit to be subjected to foaming therein, wherein said basic armrest unit comprises:

a three-dimensional trim cover assembly of a predetermined shape of armrest body, said three-dimensional trim cover assembly including at least one through-hole (31A) formed therein, the through-hole having a circular edge portion;

a support element disposed inside of said three-dimensional trim cover assembly, said support element having two end portions, wherein at least one of said two end portions projects outwardly through said at least one through-hole of the three dimensional trim cover assembly, wherein said connecting bracket is rotatably secured to said at least one of said two end portions of said support element, and wherein, in a foaming process, a liquid foaming agent is to be injected into the inside of said three-dimensional trim cover assembly and then cured into an increased mass of foam padding filled in the three-dimensional trim cover assembly, thereby foaming a resultant armrest having said connecting bracket provided exteriorly of one side thereof in a rotatable manner, said foaming die device comprising:
a first die element;
a second die element movable for engagement with said first die element to define a working die area inside of both of said first and second die elements, said working die area being adapted to allow said three-dimensional trim cover assembly to be placed therein;
a recession defined in one or both of said first and second die elements so as to be recessed in a direction from said working die area into one lateral wall of at least one of the first and second die elements; and
an auxiliary die element to be accommodated in said recession, said auxiliary die element being adapted to enclose said connection bracket and slidably engage said support element, and being of a split type comprising a first die piece and a second die piece in such a manner as to be mated together, with said support element disposed therebetween, in a direction orthogonal to an axis of the support element, prior to said first and second die pieces being accommodated in said recession, so that the thus-mated first and second die pieces enclose said connecting bracket and slidably engage the support element, thereby allowing the mated first and second die pieces to be slidingly movable along said support element towards said at least one through-hole of said three-dimensional trim cover assembly so as to allow insertion of a part of said mated first and second die pieces in said at least one through-hole, and
wherein said part of said mated first and second die pieces is larger in diameter that said at least one through-hole of the three-dimensional trim cover assembly and also includes a recessed region defined in and about the outer surface thereof, said recessed region being adapted for allowing the entirety of the circular edge portion of said at least one through-hole to be fitted therein.

2. A foaming die device that allows a basic armrest unit having a connecting bracket projected outwardly from one side thereof to be placed therein and also allows said basic armrest unit to be subjected to foaming therein, wherein said basic armrest unit comprises:

a three-dimensional trim cover assembly of a predetermined shape of armrest body, said three-dimensional trim cover assembly including at least one through-hole (31A) formed therein, said through-hole having a circular edge portion;

a support element disposed inside said three-dimensional trim cover assembly, said support element having two end portions, wherein at least one of said two end portions projects outwardly through said at least one through-hole of the three-dimensional trim cover assembly, wherein said connecting bracket is rotatably secured to said at least one of said two end portions of said support element, and wherein, in a foaming process, a liquid foaming agent is to be injected into an inside of said three-dimensional trim cover assembly and then is cured into an increased mass of foam padding filled in the three-dimensional trim cover assembly, thereby foaming a resultant armrest having said connecting bracket provided exteriorly of one side thereof in a rotatable manner, said foaming die device comprising:
a first die element;
a second die element movable for engagement with said first die element to define a working die area inside of both of said second and first die elements, said working die area being adapted to allow said three-dimensional trim cover assembly to be placed therein;
a recession defined in one or both of said first and second die elements so as to be recessed in a direction from said working die area into one lateral wall of at least one of the first and second die elements; and
an auxiliary die element to be accommodated in said recession, said auxiliary die element being adapted to enclose said connecting bracket and slidably engage said support element, and being of a split type, said auxiliary die element comprising;
a first die piece having, defined therein, one region for receiving one half portion of said connecting bracket therein and another region for slidably and substantially engaging one half of said support element; and
a second die piece having, defined therein, one region for receiving another half portion of said connecting bracket therein and another region for slidably and substantially engaging another half of said support element, wherein said auxiliary die element is an arrangement such that, when said first and second die pieces are mated together, with said support element disposed therebetween, in a direction orthogonal to an axis of the support element, prior to said first and second die pieces being accommodated in said recession, the this mated first and second die pieces enclose said connecting bracket and slidably engage the support element, thereby allowing the mated first and second die pieces to be slidingly movable along said support element towards said at least one through-hole of said three-dimensional trim cover assembly so as to allow insertion of a part of said mated first and second die pieces in said at least one through-hole, and wherein said part of said mated first and second die pieces is larger in diameter that said at least one through-hole of the three-dimensional trim cover assembly and also includes a recessed region defined in and about the outer surface thereof, said recessed region being adapted for allowing an entirety of the circular edge portion of said at least of through-hole to be fitted therein.

3. The foaming die device of claim 2, wherein said first die piece of said auxiliary die element includes a protrudent half portion having a semi-circular recessed region formed therein, and said second die piece of said auxiliary die element includes a protrudent half portion having a semi-circular recessed region formed therein, such that, when said first and second die pieces are mated together, the two protrudent half portions of the first and second die pieces are mated and matched together, thereby defining a columnar protrudent portion which corresponds to said part of said mated first and second die pieces, while at the same time, said semi-circular recessed region associated with the first die piece is mated and matched with said semi-circular recessed region associated with the second die piece, thereby defining a circular recessed region in and about said columnar protrudent portion, said circular recessed region corresponding to said recessed region of said mated first and second die pieces, wherein said columnar protrudent portion is slightly larger in diameter than said at least one through-hole, and wherein said circular recessed region is substantially equal in diameter to said at least one through-hole, and so adapted that the entirety of said circular edge portion of said at least one through-hole is to be engaged therein, when said columnar protrudent portion is inserted in said at least one through-hole.

4. The foaming die device of claim 2, wherein said connecting bracket has a pair of holes formed therein, and wherein a first pin is formed in said one region of said first die piece so as to be in correspondence with one of said pair of holes, and a second pin is formed in said one region of said second die piece so as to be in correspondence with another of said pair of holes, with such an arrangement that, when said mated first and second die pieces are slidingly moved along said support element towards said at least one through-hole, said first and second pins associated with the respective said first and second die pieces are displaced to and engaged in said pair of holes, respectively.

* * * * *